(12) United States Patent
Konno

(10) Patent No.: US 11,267,333 B2
(45) Date of Patent: Mar. 8, 2022

(54) EXHAUST GAS PURIFICATION DEVICE

(71) Applicant: KABUSHIKI KAISHA TOYOTA JIDOSHOKKI, Kariya (JP)

(72) Inventor: Atsushi Konno, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/964,753

(22) PCT Filed: Jan. 17, 2019

(86) PCT No.: PCT/JP2019/001199
§ 371 (c)(1),
(2) Date: Jul. 24, 2020

(87) PCT Pub. No.: WO2019/146479
PCT Pub. Date: Aug. 1, 2019

(65) Prior Publication Data
US 2020/0353813 A1    Nov. 12, 2020

(30) Foreign Application Priority Data
Jan. 29, 2018   (JP) .............................. JP2018-012904

(51) Int. Cl.
*B60K 13/04*   (2006.01)
*F01N 1/00*   (2006.01)
(Continued)

(52) U.S. Cl.
CPC .............. *B60K 13/04* (2013.01); *F01N 1/003* (2013.01); *F01N 1/02* (2013.01); *F01N 1/089* (2013.01);
(Continued)

(58) Field of Classification Search
CPC . B60K 13/04; F01N 1/003; F01N 1/02; F01N 1/089; F01N 3/106; F01N 3/022;
(Continued)

(56) References Cited

U.S. PATENT DOCUMENTS 4,050,903 A * 9/1977 Bailey ................... F01N 3/2885
422/177
4,094,644 A * 6/1978 Wagner ..................... F01N 1/08
422/181

(Continued)

FOREIGN PATENT DOCUMENTS

| CN | 1985078 A | 6/2007 |
|---|---|---|
| CN | 202266319 U | 6/2012 |

(Continued)

OTHER PUBLICATIONS

Office Action dated Jul. 5, 2021 by the Chinese Patent Office in Chinese Application No. 201980007170.3.
(Continued)

*Primary Examiner* — Audrey B. Walter
(74) *Attorney, Agent, or Firm* — Sughrue Mion, PLLC

(57) ABSTRACT

An exhaust gas purification device includes a pre-oxidation catalyst disposed in an exhaust gas passage and a muffler that is provided in such a manner as to surround the pre-oxidation catalyst, and discharges exhaust gas while reducing noise. The muffler has an inlet which is connected to an upstream side exhaust pipe and an outlet which is connected to a downstream side exhaust pipe. The exhaust gas purification device includes a downstream side purification device that is disposed in the exhaust gas passage, and accommodates a second oxidation catalyst and a particulate matter removing filter. The exhaust gas is discharged to the atmosphere after the exhaust gas flows through the downstream side purification device.

8 Claims, 7 Drawing Sheets

(51) Int. Cl.
  *F01N 1/08* (2006.01)
  *F01N 1/02* (2006.01)
  *F01N 3/022* (2006.01)
  *F01N 3/10* (2006.01)
  *F01N 3/24* (2006.01)
  *F01N 3/28* (2006.01)

(52) U.S. Cl.
  CPC ............. *F01N 3/022* (2013.01); *F01N 3/106* (2013.01); *F01N 3/24* (2013.01); *F01N 3/2803* (2013.01); *F01N 3/2885* (2013.01); *F01N 2490/04* (2013.01)

(58) Field of Classification Search
  CPC ........ F01N 3/24; F01N 3/2803; F01N 3/2885; F01N 2490/04
  See application file for complete search history.

(56) References Cited

U.S. PATENT DOCUMENTS

| | | | |
|---|---|---|---|
| 4,209,493 A * | 6/1980 | Olson | F01N 3/34 422/176 |
| 5,376,341 A | 12/1994 | Gulati | |
| 5,897,843 A * | 4/1999 | Ishibashi | F01N 3/28 422/177 |
| 7,836,688 B2 | 11/2010 | Woerner et al. | |
| 7,997,071 B2 | 8/2011 | Blaisdell | |
| 8,979,125 B2 * | 3/2015 | Sato | E02F 9/0866 280/759 |
| 2004/0202590 A1 | 10/2004 | Jacab et al. | |
| 2004/0202591 A1 | 10/2004 | Jacob et al. | |
| 2006/0101813 A1 | 5/2006 | Wu | |
| 2008/0155966 A1 | 7/2008 | Chang | |
| 2011/0005853 A1 * | 1/2011 | Kamiya | F01N 3/2066 180/296 |
| 2011/0100094 A1 * | 5/2011 | Konrad | F01N 11/002 73/28.04 |
| 2013/0008528 A1 | 1/2013 | Mitsuda et al. | |
| 2013/0175109 A1 * | 7/2013 | Takatsuji | B60K 13/04 180/309 |
| 2015/0040542 A1 | 2/2015 | Mitsuda et al. | |
| 2017/0217304 A1 * | 8/2017 | Kawazoe | B66F 9/07554 |

FOREIGN PATENT DOCUMENTS

| | | | |
|---|---|---|---|
| EP | 0579956 A1 | | 1/1994 |
| EP | 1467070 A1 | | 10/2004 |
| EP | 1475522 B1 | | 10/2005 |
| EP | 2 405 109 A2 | | 1/2012 |
| FR | 2819550 A1 | | 7/2002 |
| JP | 60-043111 U | | 3/1985 |
| JP | 10-141050 A | | 5/1998 |
| JP | 2008156835 A | * | 7/2008 ............. B60K 11/04 |
| JP | 2009292363 A | * | 12/2009 ............. B60K 11/04 |
| JP | 2011-094511 A | | 5/2011 |
| JP | 2011-196344 A | | 10/2011 |
| JP | 2012-017692 A | | 1/2012 |

OTHER PUBLICATIONS

Communication dated Jun. 11, 2021, from the Australian Patent Office in application No. 2019213090.

Extended European Search Report dated Sep. 8, 2021 from the European Patent Office in EP Application No. 19744326.0.

* cited by examiner

EXHAUST GAS PURIFICATION DEVICE

CROSS-REFERENCE TO RELATED APPLICATIONS

This application is a National Stage of International Application No. PCT/JP2019/001199 filed Jan. 17, 2019, claiming priority based on Japanese Patent Application No. 2018-012904 filed Jan. 29, 2018, the contents of all of which are incorporated herein by reference in their entirety.

TECHNICAL FIELD

The present invention relates to an exhaust gas purification device that purifies exhaust gas discharged from an internal combustion engine.

BACKGROUND ART

An exhaust gas purification device of a diesel engine, which purifies exhaust gas, has a purifying processing member, such as particulate matter removing filter (hereinafter, referred to as diesel particulate filter or DPF) for capturing and removing particulate matter (Particulate Matter or PM) from exhaust gas, and an oxidation catalyst (diesel oxidation catalyst or DOC) for oxidizing and removing nitrogen oxide (NOx), carbon monoxide (CO), hydrocarbon (HC), etc.

For example, the following Patent Document 1 discloses an exhaust gas purification device that has a configuration in which a relatively small pre-oxidation catalyst is disposed in an exhaust pipe on the upstream side thereof, and NOx storage catalyst and a DPF are disposed on the downstream side of the pre-oxidation catalyst. Exhaust gas discharged from a diesel engine passes through the exhaust pipe and flows to the outside of the diesel engine. The exhaust gas flows through the pre-oxidation catalyst, the NOx storage catalyst, and the DPF to be purified, and then, is discharged into the atmosphere through a noise reduction device (muffler) disposed separately from the pre-oxidation catalyst, the NOx storage catalyst, and the DPF on the downstream side of the exhaust pipe.

An exhaust gas purification device described in the following Patent Document 2 has a diesel oxidation catalyst and outer cases in which gas purification members of a soot filter are accommodated. The oxidation catalyst and the outer cases are arranged in a direction in which the exhaust gas flows and connected with each other. A noise reduction unit (muffler) that has an exhaust gas outlet pipe is attached to the outer case on the downstream side toward which exhaust gas flows. The Patent Document 2 discloses the exhaust gas purification device that has a configuration in which the outer cases and the noise reduction unit are arranged in the direction in which the exhaust gas flows to be integrally disposed with each other.

CITATION LIST

Patent Documents

Patent Document 1: Japanese Patent Application Publication No. 2012-17692
Patent Document 2: Japanese Patent Application Publication No. 2011-196344

SUMMARY OF INVENTION

Technical Problem

However, in an industrial vehicle such as a forklift, a downstream side purification device that has a DPF and an oxidation catalyst, etc. is disposed on the downstream side of a pre-oxidation catalyst, and the downstream side purification device are mounted in a small space provided on the rear side of an engine. Thus, when the downstream side purification device and a noise reduction device (muffler) are disposed separately from each other, it is difficult to ensure a space in which the noise reduction device (muffler) is disposed on the rear side of an engine. In addition, when the downstream side purification device and the noise reduction device (muffler) are disposed integrally with each other, an arrangement space of the downstream side purification device and the noise reduction device (muffler) needs to be ensured, so that a miniaturization of the forklift becomes difficult.

The present invention has been made in view of such circumstances, and it is an objective of the present invention to provide an exhaust gas purification device that easily ensures an arrangement space of a downstream side purification device having a DPF and an oxidation catalyst, etc. and a muffler.

Solution to Problem

To solve the above problem, the first invention of the present invention is an exhaust gas purification device that includes a pre-oxidation catalyst disposed in an exhaust gas passage disposed right next to an engine mounted in a vehicle body, and a muffler that is provided in such a manner as to surround the pre-oxidation catalyst, and discharges exhaust gas generated in the engine while reducing noise. The muffler has an inlet which is connected to an upstream side exhaust pipe right next to the engine, and into which the exhaust gas is introduced, and an outlet which is connected to a downstream side exhaust pipe, and from which the exhaust gas introduced from the inlet is discharged through the pre-oxidation catalyst. The exhaust gas purification device includes a downstream side purification device that is disposed in the exhaust gas passage on a downstream side of the muffler, and accommodates a second oxidation catalyst that is larger than the pre-oxidation catalyst and a particulate matter removing filter. The exhaust gas is discharged to the atmosphere after the exhaust gas flows through the downstream side purification device.

Next, the second invention of the present invention is the exhaust gas purification device according to the first invention as described above, wherein the pre-oxidation catalyst has a catalyst support that supports catalyst particles, and a metal substrate that has thereon the catalyst support.

Next, the third invention of the present invention is the exhaust gas purification device according to the first invention or the second invention as described above, wherein the muffler has a noise-reducing tubular portion that is formed in a tubular shape, and in which the pre-oxidation catalyst is disposed, a first expansion chamber which is formed between the inlet and the pre-oxidation catalyst, and into which the exhaust gas flows, a first partition wall portion that is disposed on an outflow side of the first expansion chamber and seals between an outer circumferential surface of the pre-oxidation catalyst at an inflow side end portion thereof and an inner circumferential surface of the noise-reducing tubular portion, a second partition wall portion that faces the first partition wall portion and seals between an outer circumferential surface of the pre-oxidation catalyst at an outflow side end portion thereof and the inner circumferential surface of the noise-reducing tubular portion, and a second expansion chamber which is formed between the second partition wall portion and the pre-oxidation catalyst at the outflow side end portion thereof, and the outlet, wherein the exhaust gas flows into the second expansion chamber through the pre-oxidation catalyst. The pre-oxidation catalyst is supported by the first partition wall portion and the second partition wall portion in the noise-reducing tubular portion.

Next, the fourth invention of the present invention is the exhaust gas purification device according to the first invention or the second invention as described above, wherein the muffler has a noise-reducing tubular portion that is formed in a tubular shape, and in which the pre-oxidation catalyst is disposed, a connecting pipe that has at one end thereof the inlet and is at the other end thereof connected to the pre-oxidation catalyst at the inflow side end portion of the pre-oxidation catalyst, wherein the exhaust gas introduced into the inlet flows out to the pre-oxidation catalyst at the inflow side end portion thereof through the connecting pipe, a first partition wall portion that seals between an outer circumferential surface of the pre-oxidation catalyst at an inflow side end portion thereof and an inner circumferential surface of the noise-reducing tubular portion, a second partition wall portion that faces the first partition wall portion and seals between the outer circumferential surface of the pre-oxidation catalyst at an outflow side end portion thereof and the inner circumferential surface of the noise-reducing tubular portion, and an expansion chamber which is formed between the second partition wall portion and the pre-oxidation catalyst at the outflow side end portion thereof, and the outlet, wherein the exhaust gas flows into the expansion chamber through the pre-oxidation catalyst. The pre-oxidation catalyst is supported by the first partition wall portion and the second partition wall portion in the noise-reducing tubular portion.

Next, the fifth invention of the present invention is the exhaust gas purification device according to the third invention or the fourth invention as described above, wherein the second partition wall portion has a plurality of through holes that are formed through a surface of the second partition wall portion that faces the first partition wall portion.

Next, the sixth invention of the present invention is the exhaust gas purification device according to the first invention or the second invention as described above, wherein the muffler has a noise-reducing tubular portion that is formed in a tubular shape, and in which the pre-oxidation catalyst is disposed, a first expansion chamber which is formed between the inlet and the pre-oxidation catalyst, and into which the exhaust gas flows, a first partition wall portion that is disposed on an outflow side of the first expansion chamber and seals between an outer circumferential surface of the pre-oxidation catalyst at an inflow side end portion thereof and an inner circumferential surface of the noise-reducing tubular portion, a perforated pipe that is at one end thereof connected to the outer circumferential surface of the pre-oxidation catalyst at an outflow side end portion of the pre-oxidation catalyst, and at the other end thereof connected to the outlet, the perforated pipe having a plurality of perforated holes that are formed through an outer circumferential surface of the perforated pipe, and an outer circumferential expansion chamber that is provided between the outer circumferential surface of the perforated pipe and the outer circumferential surface of the pre-oxidation catalyst, and the inner circumferential surface of the noise-reducing tubular portion, wherein the exhaust gas flowing through the pre-oxidation catalyst flows into the outer circumferential expansion chamber through the plurality of the perforated holes. The pre-oxidation catalyst is supported by the first partition wall portion and the one end of the perforated pipe in the noise-reducing tubular portion.

Advantageous Effects of Invention

According to the first invention, the pre-oxidation catalyst has a relatively small capacity (for example, the capacity of about 0.1 liters to 0.5 liters). With this configuration, the muffler is provided in such a manner as to surround the pre-oxidation catalyst, so that the muffler may be disposed in a space for mounting the engine. Accordingly, by using the space for mounting the engine effectively, an arrangement space of the muffler may be easily ensured. In addition, after the exhaust gas flows through the downstream side purification device accommodating the second oxidation catalyst that is larger than the pre-oxidation catalyst and the particulate matter removing filter (DPF), the exhaust gas is discharged to the atmosphere. Accordingly, the muffler need not be connected to the downstream side purification device, so that the arrangement space of the downstream side purification device may be easily ensured. Therefore, the miniaturization of the vehicle body, for example, the forklift may be achieved.

According to the second invention, in the pre-oxidation catalyst, for example, a layer of the catalyst support made of aluminum oxide etc. is formed and supported on a surface of the metal substrate that has a honey-comb structure made of heat resistant metal such as stainless steel. In addition, catalyst particles such as platinum (Pt), palladium (Pd), and rhodium (Rh) are supported on the catalyst supports. With this configuration, the metal substrate has a small heat capacity. A space around the metal substrate is formed to be the expansion chamber of the muffler and a volume of the expansion chamber is increased, so that temperature decrease of the pre-oxidation catalyst is prevented due to heat insulation effect of the exhaust gas.

According to the third invention, moving the pre-oxidation catalyst that is supported by the first partition wall portion and the second partition wall portion in the noise-reducing tubular portion may change a volume of the first expansion chamber formed on the upstream side of the pre-oxidation catalyst and a volume of the second expansion chamber formed on the downstream side of the pre-oxidation catalyst. Thus, the frequency of noise of the muffler to be particularly reduced is determined, so that noise reduction effect may be exhibited.

According to the fourth invention, moving the pre-oxidation catalyst supported by the first partition wall portion and the second partition wall portion in the noise-reducing tubular portion may change a volume of the expansion chamber formed on the downstream side of the pre-oxidation catalyst. Thus, the frequency of noise of the muffler to be particularly reduced is determined, so that noise reduction effect may be exhibited. In addition, this configuration does not have the expansion chamber on the upstream side of the pre-oxidation catalyst, so that further miniaturization of the muffler may be achieved.

According to the fifth invention, the exhaust gas flows into an outer circumferential portion of the pre-oxidation catalyst through the through holes formed in the surface of the second partition wall portion facing the first partition wall portion, so that temperature decrease of the pre-oxidation catalyst may be effectively prevented. Changing the number and a shape of the through holes formed in the surface of the second partition wall portion facing the first partition wall portion determines frequency of noise of the muffler to be particularly reduced, so that the noise reduction effect may be enhanced.

According to the sixth invention, the noise reduction effect may be exhibited by the first expansion chamber formed on the upstream side of the pre-oxidation catalyst and the outer circumferential expansion chamber formed on the outer circumferential portion of the perforated pipe and the outer circumferential portion of the pre-oxidation catalyst, which are continued therebetween. Furthermore, changing the number and shapes of the through holes formed in an outer circumferential surface of the perforated pipe determines a frequency of noise of the muffler to be particularly reduced, so that the noise reduction effect may be enhanced. In addition, exhaust gas flows into the outer circumferential expansion chamber covering the outer circumferential portion of the pre-oxidation catalyst through the through holes formed in the outer circumferential surface of the perforated pipe, so that temperature decrease of the pre-oxidation catalyst may be effectively prevented.

According to the seventh invention, after the exhaust gas flows through the downstream side purification device accommodating the second oxidation catalyst that is larger than the pre-oxidation catalyst and the particulate matter removing filter (DPF), the exhaust gas is discharged to the atmosphere.

Accordingly, the muffler need not be connected to the downstream side purification device, so that the arrangement space of the downstream side purification device may be easily ensured. Therefore, the miniaturization of the vehicle body, for example, the forklift may be achieved.

DESCRIPTION OF EMBODIMENTS

Figure 1:
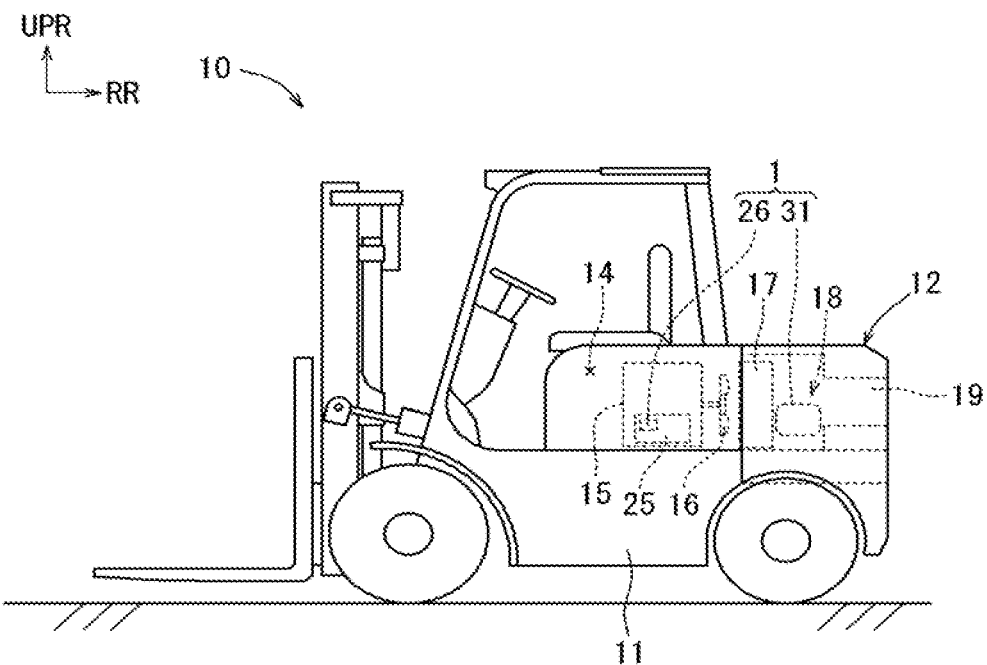
FIG. 1 is a side view of an example of a forklift that includes an exhaust gas purification device according to an embodiment.
Figure 2:
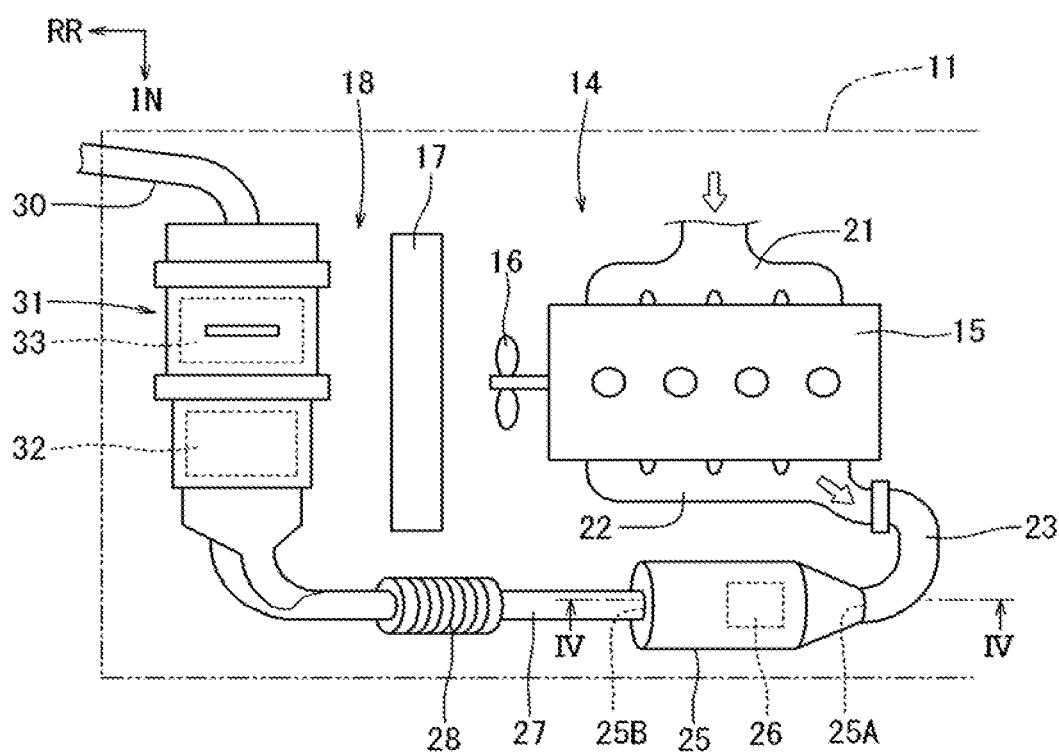
FIG. 2 is a cross-sectional side view of a main part of the forklift showing the exhaust gas purification device disposed in an engine compartment and a counterweight.
Figure 3:
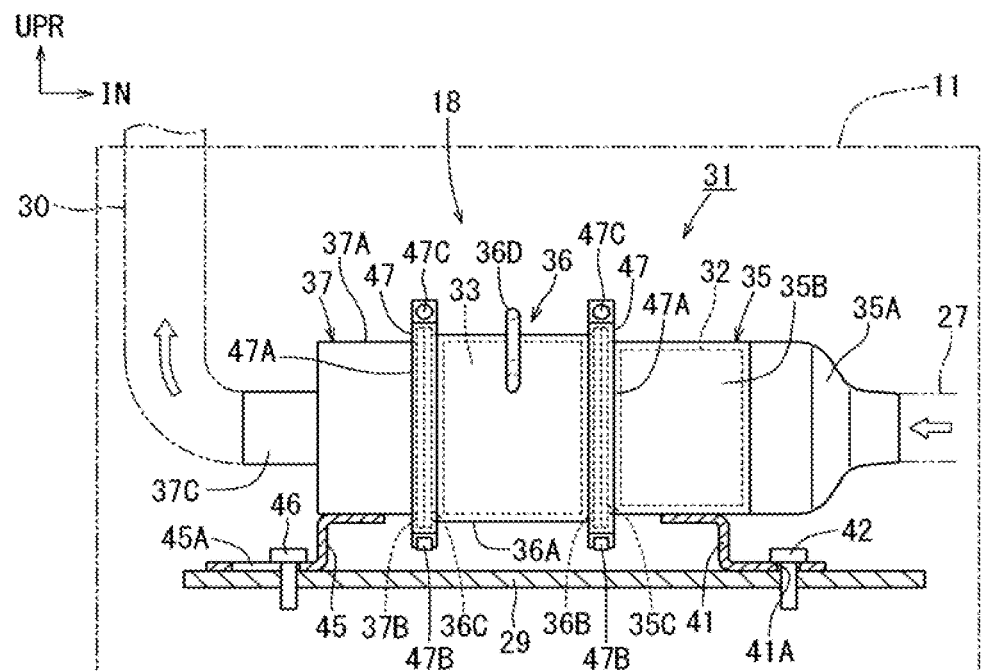
FIG. 3 is a front view of a downstream side purification device.

The following will describe an exemplary embodiment according to the present invention in which an exhaust gas purification device of the present invention is applied to a forklift with reference to the drawings. First, an overall structure of a forklift 10 on which an exhaust gas purification device 1 is mounted will be described with reference to FIGS. 1 and 2. It is noted that arrows RR and UPR indicated in FIGS. 1 to 3 show the rear side and the upper side of the vehicle, respectively. Furthermore, an arrow IN shows the inner side of the vehicle width direction.

Referring to FIG. 1, the forklift 10 includes a vehicle body 11 and a counterweight 12 which is mounted to a rear part of the vehicle body 11. An engine 15 is mounted in an engine compartment 14 of the vehicle body 11. The engine 15 is configured by a diesel engine, for example. The engine compartment 14 has in a side wall thereof an outside air intake port, which is not illustrated. A fan 16 which is driven or rotated by the engine 15 is provided to the rear side of the engine 15.

A radiator 17 configured to cool the coolant water of the engine 15 is disposed on the rear side of the fan 16. The fan 16 is driven by the engine 15 to take outside air (air) into the engine compartment 14 through the outside air intake port, and then, blows the air onto the radiator 17. With this operation, the coolant water of the engine 15 is cooled. The air blown onto the radiator 17 flows through a ventilation chamber 18, which is a substantially box-shaped chamber having an open front side and is formed on the rear side of the radiator 17, and then, is blown toward the rear side of the vehicle through a rear air outlet port 19 formed through a rear wall portion of the counterweight 12 in the back and force direction of the vehicle. The rear air outlet port 19 is, for example, formed in a rectangle in a cross-sectional view whose length of the long side is substantially the same as that of the ventilation chamber 18 in the vehicle width direction, and length of the short side is substantially the same as the height of the upper half of the ventilation chamber 18.

As illustrated in FIGS. 1 and 2, air sucked from an air cleaner, which is not illustrated, is introduced into an intake manifold 21 and supplied to the engine 15. The air is combusted with fuel in the engine 15, so that exhaust gas is generated and introduced into an upstream side exhaust pipe 23 through a discharge manifold 22. One end of the upstream side exhaust pipe 23 is connected to an outlet of the discharge manifold 22, and the other end of the upstream side exhaust pipe 23 is connected to an inlet 25A of a muffler 25 (see FIG. 4) that is disposed beside the engine 15 In other words, the inlet 25A of the muffler 25 is connected to the upstream side exhaust pipe 23 right next to the engine 15.

A pre-oxidation catalyst 26 that has a small capacity (for example, the capacity of 0.1 liters to 0.5 liters) is disposed in the muffler 25. In other words, the pre-oxidation catalyst 26 is surrounded by the muffler 25, and disposed right next to the engine 15. The exhaust gas introduced from the inlet 25A of the muffler 25 (see FIG. 4) flows through the pre-oxidation catalyst 26, and then, is introduced into a downstream side exhaust pipe 27 connected to an outlet 25B of the muffler 25 (see FIG. 4), as described later.

The pre-oxidation catalyst 26 cooperates with the muffler 25 to form an exhaust gas passage. As described later, the pre-oxidation catalyst 26 oxidizes and removes hazardous substances contained in the exhaust gas while the exhaust gas flows through the pre-oxidation catalyst 26. One end of the downstream side exhaust pipe 27 is connected to the outlet 25B of the muffler 25. The other end of the downstream side exhaust pipe 27 is brought to the ventilation chamber 18 through a connecting pipe 28 that is formed in a bellows shape to be connected a downstream side purification device 31 on the upstream side thereof.

The downstream side purification device 31 is disposed in the ventilation chamber 18 formed on the rear side of the vehicle from the radiator 17 and extends along the vehicle width direction across the entire width of ventilation chamber 18. One end of an exhaust pipe 30 through which the exhaust gas is discharged into the atmosphere is connected to the downstream side purification device 31 on the downstream side thereof. The downstream side purification device 31 cooperates with the downstream side exhaust pipe 27, the connecting pipe 28, and the exhaust pipe 30 to form the exhaust gas passage. The downstream side purification device 31 removes hazardous substances contained in the exhaust gas while the exhaust gas flows from the upstream side to the downstream side of the downstream side purification device 31. Thus, the exhaust gas purification device 1 is configured of the pre-oxidation catalyst 26 and the downstream side purification device 31.

It is to be noted that, although the engine 15 is high-efficient and superior in the durability, hazardous substances, such as particulate matter (PM), nitrogen oxide (NOx), carbon monoxide (CO), and hydrocarbon (HC), may be discharged with the exhaust gas. The pre-oxidation catalyst 26 oxidizes and removes nitrogen oxide (NOx), carbon monoxide (CO), and hydrocarbon (HC), and the like. In addition, the downstream side purification device 31 is configured to include a second oxidation catalyst (diesel oxidation catalyst or DOC) 32 disposed on the upstream side thereof and a DPF 33 on the downstream side thereof. The second oxidation catalyst 32 oxidizes and removes nitrogen oxide (NOx), carbon monoxide (CO), hydrocarbon (HC), etc. The DPF 33 is configured to capture and remove particulate matter (PM).

Next, the overall structure of the downstream side purification device 31 will be described with reference to FIG. 3. Referring to FIG. 3, the downstream side purification device 31 is mounted on a purification device supporting bracket 29 disposed in the ventilation chamber 18, and disposed on the lower side of the rear air outlet port 19 and extends along the vehicle width direction. The purification device supporting bracket 29 is formed in a rectangle in a plan view which is long in the vehicle width direction. Accordingly, as described later, this configuration permits a worker to mount and remove the DPF 33 of the downstream side purification device 31 through the rear air outlet port 19.

The downstream side purification device 31 includes an upstream cylinder 35 disposed on the upstream side of the downstream side purification device 31, a downstream cylinder 37 disposed on the downstream side of the downstream side purification device 31, and a purifying cylinder 36 that is removably serially connected between and coaxially with the upstream cylinder 35 and the downstream cylinder 37. The second oxidation catalyst 32 and the DPF 33 are accommodated in the upstream cylinder 35 and the purifying cylinder 36, respectively.

The upstream cylinder 35 includes an introducing tubular portion 35A through which the exhaust gas is introduced, a cylinder portion 35B, a flange portion 35C, and the second oxidation catalyst 32 accommodated in the cylinder portion 35B. The introducing tubular portion 35A is formed in a tubular shape, and has a circular cross section whose diameter is gradually expanded as the introducing tubular portion 35A extends toward the downstream side (left side in FIG. 3) in the axial direction of the downstream side purification device 31. An upstream end portion of the introducing tubular portion 35A is connected to the downstream side exhaust pipe 27. The cylinder portion 35B is cylindrically formed, and the whole circumference of the upstream end portion of the cylinder portion 35B is connected by welding, etc. to a downstream end portion of the introducing tubular portion 35A that has the expanded diameter. The second oxidation catalyst 32 formed in a substantially circular columnar shape is fitted in the cylinder portion 35B substantially across the entire length of the cylinder portion 35B. The whole circumference of the flange portion 35C is connected by welding, etc. to the downstream end portion of the cylinder portion 35B so that the flange portion 35C has a shape of a collar.

The second oxidation catalyst 32 is formed of a cellular cylinder body that has a large capacity (for example, the capacity of several liters) and whose outer diameter is substantially the same as the inner diameter of the cylinder portion 35B. The cellular cylinder body is made of ceramic such as cordierite. The second oxidation catalyst 32 has a number of through holes that extend in the axial direction of the downstream side purification device 31. Inner surfaces of the through holes are coated with a noble metal such as platinum (Pt). Exhaust gas at a specified temperature flows through a number of the through holes of the second oxidation catalyst 32 so that the second oxidation catalyst 32 oxides and removes nitrogen oxide (NOx), carbon monoxide (CO), hydrocarbon (HC), etc. contained in exhaust gas.

The upstream cylinder 35 having the above-described configuration includes a first support member 41 which is a plate member bent in a crank shape in a side view and disposed at the bottom surface side of the cylinder portion 35B. An upper end face of the first support member 41 is fixed by welding, etc. to the bottom surface side of the cylinder portion 35B so that a lower end portion of the first support member 41 is located under the introducing tubular portion 35A. The first support member 41 has a through hole 41A formed in the lower end portion thereof. The first support member 41 is placed on the upper surface of the purification device supporting bracket 29 and fixed with a bolt 42 inserted through the through hole 41A.

The downstream cylinder 37 includes a cylinder portion 37A, a flange portion 37B, and a discharge cylinder portion 37C. The exhaust gas that has flowed through the DPF 33 accommodated in the purifying cylinder 36 is introduced into the cylinder portion 37A, and then, discharged through the discharge cylinder portion 37C to which one end of the exhaust pipe 30 is connected. An outer diameter of the cylinder portion 37A is substantially the same as that of the cylinder portion 35B of the upstream cylinder 35, and the cylinder portion 37A is formed in a cylindrical shape that has the slightly smaller length than that of the cylinder portion 35B in the axial direction of the downstream side purification device 31. A downstream end of the cylinder portion 37A is closed. The cylinder portion 37A has at a center portion thereof a through hole having the substantially same diameter as that of the discharge cylinder portion 37C. The discharge cylinder portion 37C is connected by welding, etc. to an outer end of the cylinder portion 37A around the thorough hole so as to be coaxial with the cylinder portion 37A in the axial direction. The whole circumference of the flange portion 37B is connected by welding, etc. to an upstream end portion of the cylinder portion 37A so that the flange portion 37B has a shape of a collar.

The downstream cylinder 37 having the above-described configuration includes a second support member 45 which is a plate member bent in a crank shape in a side view and disposed at the bottom surface side of the cylinder portion 37A. An upper end face of the second support member 45 is fixed by welding, etc. to the bottom surface of the cylinder portion 37A so that a lower end portion of the second support member 45 is located on the downstream side far from the cylinder portion 37A in the axial direction of the downstream side purification device 31. The second support member 45 has a long hole 45A that is long in the axial direction, and is positioned in the lower end portion of the second support member 45. The second support member 45 is placed on the upper surface of the purification device supporting bracket 29 and fixed with a bolt 46 inserted through the long hole 45A. As illustrated in FIG. 3, when the purifying cylinder 36 is mounted between and coaxially with the upstream cylinder and the downstream cylinder 37, the bolt 46 is positioned near one end of the long hole 45A on the downstream side of the downstream side purification device 31 and tightened.

The purifying cylinder 36 includes a cylindrical cylinder portion 36A into which the exhaust gas that has flowed through the second oxidation catalyst 32 accommodated in the upstream cylinder 35 is introduced, an upstream flange portion 36B, a downstream flange portion 36C, a handle 36D, and the DPF 33 accommodated in the cylinder portion 36A. The cylinder portion 36A is formed in a substantially cylindrical shape having an outer diameter that is substantially the same as that of the cylinder portion 35B of the upstream cylinder 35. The DPF 33 that is formed in a substantially circular columnar shape and has a large capacity (for example, the capacity of several liters) is fitted in the cylinder portion 36A substantially across the entire length thereof.

The whole circumference of the upstream flange portion 36B is connected by welding, etc. to an upstream end portion of the cylinder portion 36A so that the upstream flange portion 36B has a shape of a collar. The whole circumference of the downstream flange portion 36C is connected by welding, etc. to a downstream end portion of the cylinder portion 36A so that the downstream flange portion 36C has a shape of a collar. The upstream flange portion 36B and the downstream flange portion 36C have the same configuration. The cylinder portion 36A has the bar-shaped handle 36D that is bent in a substantially U-shape and disposed at a middle position of the outer circumferential surface of the cylinder portion 36A in the axial direction of the downstream side purification device 31. The handle 36D is connected by welding, etc. to the outer circumferential surface of the cylinder portion 36A so that opposite ends of the handle 36D are arranged along a circumferential direction of the cylinder portion 36A. With this configuration, a worker can carry the purifying cylinder 36 by holding the handle 36D.

The DPF 33 is formed in a circular columnar shape by, for example, a porous member made of ceramic materials, etc. The DPF 33 is a cellular cylindrical member having honeycomb structure in which a large number of small holes are formed in the axial direction of the downstream side purification device 31. The one end of each small hole is open, and the other end is closed by a seal member. The adjacent small holes formed on one end surface of DPF 33 alternately have an open end and a closed end, respectively. The DPF 33 captures particulate matter by allowing the exhaust gas flowing into the respective small holes from the upstream side through the porous member, and allows only the exhaust gas to flow out to the downstream side through the adjacent small holes.

In this case, the particulate matter captured by the DPF 33 is periodically combusted and removed by increasing the temperature of the exhaust gas. Part of the particulate matter combusted to ash gradually accumulates in the small holes. The remaining unburnt particulate matter, such as heavy metal, calcium, etc. in the engine oil also gradually accumulates. Thus, the downstream side purification device 31 is configured so that the DPF 33 may be cleaned by removing the purifying cylinder 36, as described later.

Subsequently, steps of mounting the purifying cylinder 36 of the downstream side purification device 31 having the above-described configuration between the upstream cylinder 35 and the downstream cylinder 37 will now be described with reference to FIG. 3. The worker reaches for the handle 36D of the purifying cylinder 36 from the counterweight 12 on the rear side of the vehicle through the rear air outlet port 19 whose height in an upper and lower direction of the vehicle is larger than the diameter of the purifying cylinder 36. First, the worker holding the handle 36D positions the purifying cylinder 36 between the upstream cylinder 35 and the downstream cylinder 37. Subsequently, the worker moves the purifying cylinder 36 toward the upstream cylinder 35 to bring the upstream flange portion 368 of the purifying cylinder 36 into contact with the flange portion 35C of the upstream cylinder 35. It is noted that the upstream cylinder 35 is fixed onto the purification device supporting bracket 29 with the first support member 41 interposed therebetween with the bolt 42.

The worker slightly loosens the bolt 46 inserted through the long hole 45A, and moves the downstream cylinder 37 toward the purifying cylinder 36 to bring the flange portion 37B of the downstream cylinder 37 into contact with the downstream flange portion 36C of the purifying cylinder 36. Then, the worker assembles annular clamping members 47 into outer circumferential portions in a radial direction of the downstream side purification device 31 of the upstream flange portion 36B of the purifying cylinder 36 and flange portion 35C of the upstream cylinder 35, and outer circumferential portions in the radial direction of the downstream flange portion 36C of the purifying cylinder 36 and the flange portion 37B of the downstream cylinder 37. In this state, the worker tightens the bolt 46 inserted through the long hole 45A of the second support member 45 and fixes the downstream cylinder 37 onto the purification device supporting bracket 29 with the second support member 45 interposed therebetween.

Referring to FIG. 3, one clamping member 47 includes two semi-arcuate frame bodies 47A, 47A that each have a substantially U-shape or V-shape cross-section, a hinge portion 47B turnably joining one end of each of the frame bodies 47A, and a bolt nut type connecting portion 47C connecting the other end of each of the frame bodies 47A. By tightening bolts of the connecting portions 47C, the upstream flange portion 368 of the purifying cylinder 36 and the flange portion 35C of the upstream cylinder 35 are fastened in the axial direction of downstream side purification device 31 with one of the clamping members 47. Furthermore, by tightening bolts of the connecting portions 47C, the downstream flange portion 36C of the purifying cylinder 36 and the flange portion 37B of the downstream cylinder 37 are fastened in the axial direction with the other of the clamping members 47.

Thus, the flange portions 35C and 36B, and the flange portions 36C and 37B are tightened inward in the axial direction of the downstream side purification device 31 by the respective clamping members 47, and are in contact with each other in the axial direction, so that the purifying cylinder 36 is fixed removably. In addition, in the downstream side purification device 31, the purifying cylinder 36 is disposed coaxially with and between the upstream cylinder 35 and the downstream cylinder 37, and is fixed on the purification device supporting bracket 29 while the alignment of the upstream cylinder 35, the purifying cylinder 36, and the downstream cylinder 37 in the axial direction of the downstream side purification device 31 is performed.

Accordingly, when the purifying cylinder 36 is removed, first, the worker reaches for the downstream cylinder 37 through the rear air outlet port 19 from the counterweight 12 on the rear side of the vehicle. The worker loosens the bolt 46 inserted into the long hole 45A of the second support member 45 so that the downstream cylinder 37 is movable toward the downstream side in the axial direction of the downstream side purification device 31. Subsequently, the worker holding the handle 36D of the purifying cylinder 36 removes the bolts of the connecting portions 47C of the clamping members 47 from the nuts to remove the clamping members 47, thereby taking out the purifying cylinder 36 through the rear air outlet port 19.

Subsequently, by using an air gun or the like, compressed air is blown onto the DPF 33 accommodated in the purifying cylinder 36 to remove ash of the particulate matter and unburnt residues accumulated in the small holes, so that the DPF 33 is cleaned. Thus, after the cleaning of the DPF 33, the purifying cylinder 36 accommodating the DPF 33 can be mounted again between the upstream cylinder 35 and the downstream cylinder 37.

Figure 4:
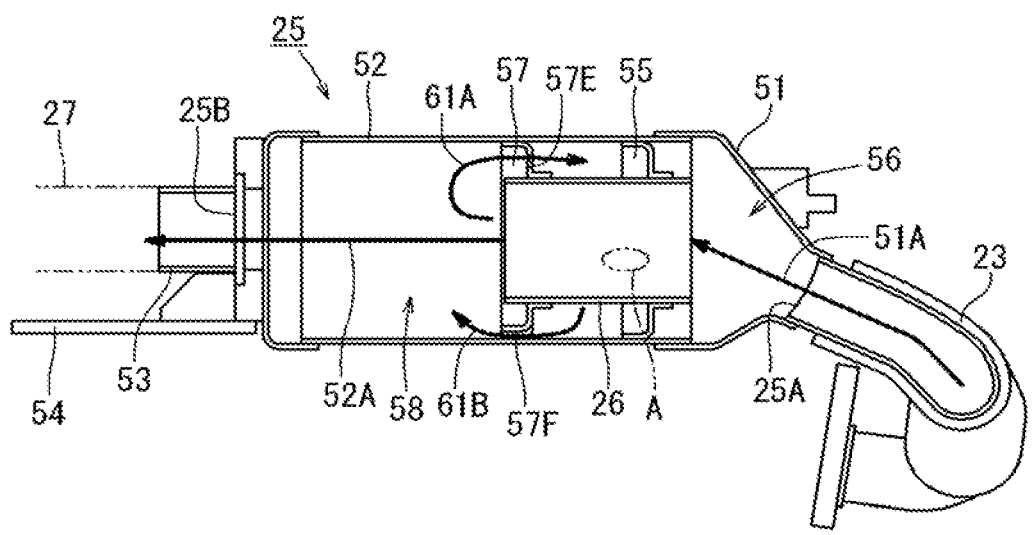
FIG. 4 is a sectional view as viewed in a direction of arrows IV, IV of FIG. 2.

Next, the configuration of the muffler 25 will be described with reference to FIGS. 4 to 9. Referring to FIG. 4, the muffler 25 includes an introducing tubular portion 51, a noise-reducing tubular portion 52 that is formed in a cylindrical shape, a discharge cylinder portion 53 through which the exhaust gas flows out, and the pre-oxidation catalyst 26 accommodated in the noise-reducing tubular portion 52. The muffler 25 having the above-described configuration is fixed with a bolt, etc. with a third support member 54 interposed therebetween in the engine compartment 14. The third support member 54 that is an L-shape in a side view is attached to an end face of the noise-reducing tubular portion 52 on the downstream side thereof in the axial direction of the muffler 25.

The upstream side exhaust pipe 23 is connected to the inlet 25A of the introducing tubular portion 51 at an upstream end portion thereof. A diameter of the introducing tubular portion 51 is gradually increased as the introducing tubular portion 51 extends toward the downstream side (left side in FIG. 4) of the muffler 25 in an obliquely upward direction. The introducing tubular portion 51 that has the expanded diameter further extends by a predetermined length (for example, about 25 mm in length) in a horizontal direction to be formed in a tubular shape that has a circular cross-section. The noise-reducing tubular portion 52 is cylindrically formed, and the whole circumference of an upstream end portion of 1s the noise-reducing tubular portion 52 is connected by welding, etc. to a downstream end portion of the introducing tubular portion 51 that has the expanded diameter. The pre-oxidation catalyst 26 formed in a substantially circular columnar shape is disposed in the noise-reducing tubular portion 52 at the upstream end portion thereof. The pre-oxidation catalyst 26 is coaxial with the noise-reducing tubular portion 52. The pre-oxidation catalyst 26 is a small oxidation catalyst whose volume is smaller than that of the second oxidation catalyst 32 (for example, the volume is 0.1 liters to 0.5 liters.).

Figure 5:
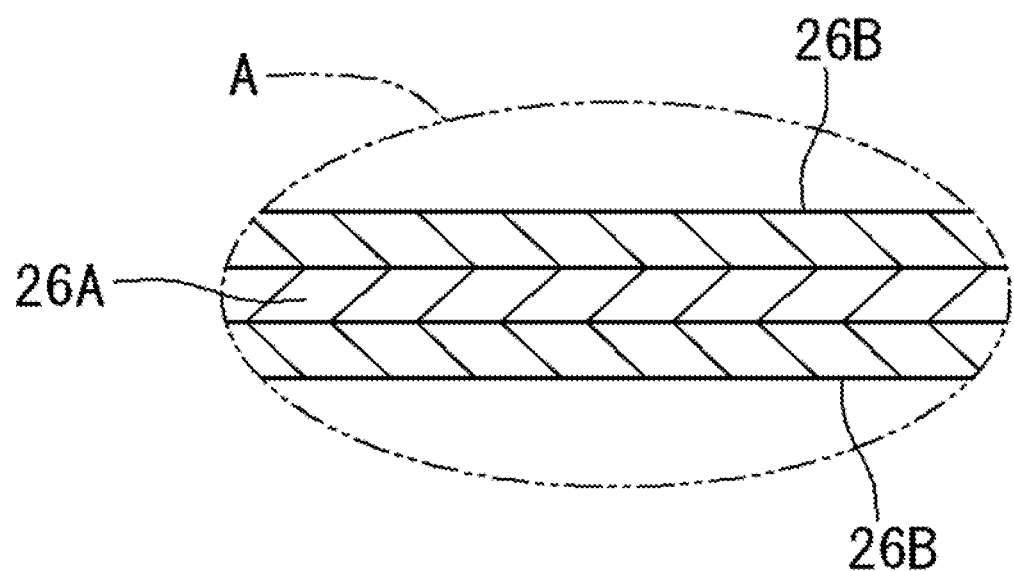
FIG. 5 is an enlarged view of a part A of FIG. 4 showing a configuration of a pre-oxidation catalyst.

Referring to FIGS. 4 and 5, a metal substrate 26A that has a honey-comb structure is used as a substrate of the pre-oxidation catalyst 26. The metal substrate 26A is made of a metal material such as stainless steel. The pre-oxidation catalyst 26 is formed in, for example, a circular columnar shape along a direction in which the exhaust gas flows. The metal substrate 26A has thereon layers of the catalyst supports 26B made of aluminum oxide as the catalyst support that supports catalyst particles. A plurality of types of catalyst particles including a noble metal such as platinum (Pt), palladium (Pd), rhodium (Rh), ruthenium (Ru), or a base metal such as nickel (Ni), cobalt (Co), silver (Ag) are supported on the catalyst supports 268.

In addition, referring to FIG. 4, a first partition wall portion 55 that has a ring shape in a front view is disposed and seals between an outer circumferential surface of the pre-oxidation catalyst 26 at an upstream end portion thereof, that is, an outer circumferential surface of the pre-oxidation catalyst 26 at an inflow side end portion thereof into which the exhaust gas flows and an inner circumferential surface of the noise-reducing tubular portion 52. With this configuration, a first expansion chamber 56 into which the exhaust gas flows through the inlet 25A is formed between the inlet 25A of the introducing tubular portion 51, and the pre-oxidation catalyst 26 and the first partition wall portion 55.

Figure 6:
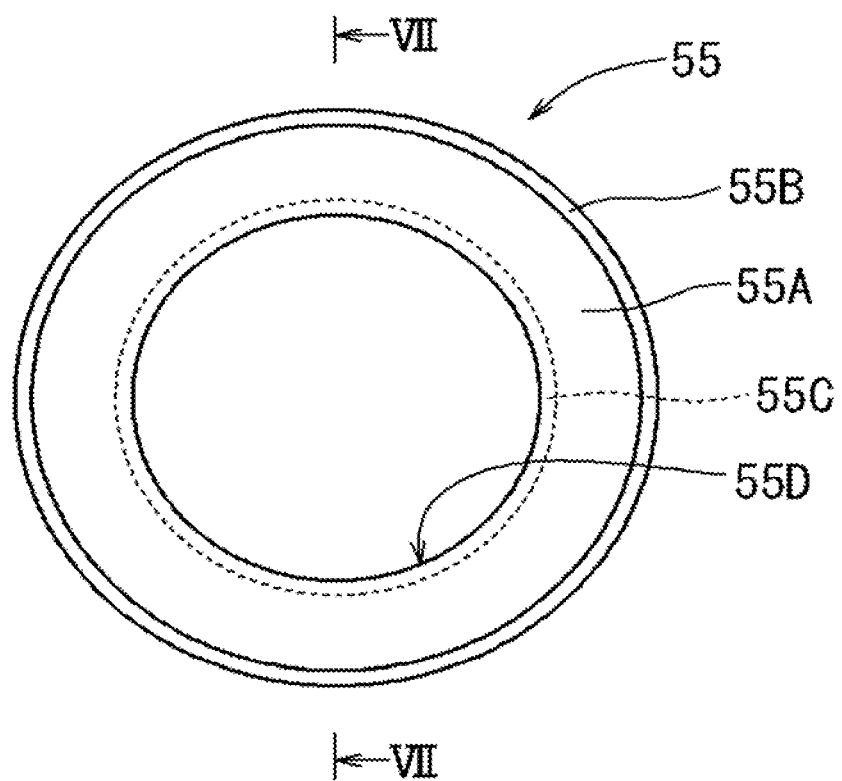
FIG. 6 is a front view of a first partition wall portion.
Figure 7:
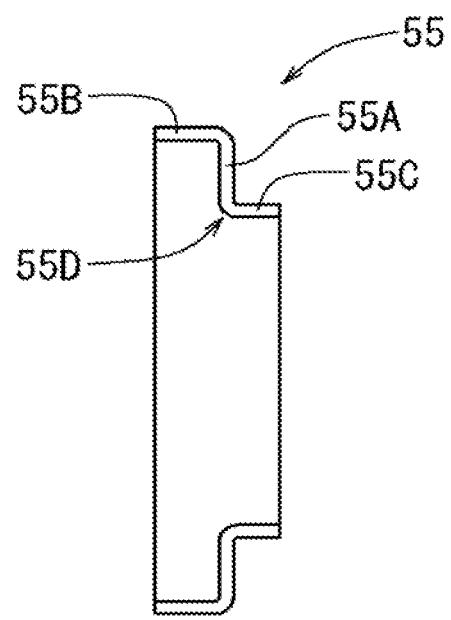
FIG. 7 is a sectional view as viewed in a direction of arrows VII, VII of FIG. 6.

The following will describe the configuration of the first partition wall portion 55 with reference to FIGS. 6 and 7. Referring to FIGS. 6 and 7, the first partition wall portion 55 is formed by a steel plate that is about 1 mm to 2 mm in thickness. The first partition wall portion 55 includes a main body 55A that has a ring shape in a front view, an outer flange portion 55B, and an inner flange portion 55C. The outer flange portion 55B and the inner flange portion 55C extend in opposite directions in the axial direction of the muffler 25. The main body 55A has an outer diameter which is substantially the same as an inner diameter of the noise-reducing tubular portion 52 and a circular opening 55D in the center portion of the main body 55A. The opening 55D has an inner diameter which is substantially the same as an outer diameter of the pre-oxidation catalyst 26. The outer flange portion 55B extends substantially perpendicular to an outer circumferential edge portion of the main body 55A over the whole circumference by a predetermined height (for example, about 20 mm in height) from the outer circumferential edge portion.

The inner flange portion 55C extends substantially perpendicular to an inner circumferential edge portion of the opening 55D in an opposite direction relative to the outer flange portion 55B in the axial direction of the muffler 25 over the whole circumference by a predetermined height (for example, about 20 mm in height) from the inner circumferential edge portion. Referring to FIG. 4, the inner flange portion 55C is fitted into the outer circumferential surface of the pre-oxidation catalyst 26 at an inflow side end portion thereof, and fixed by welding, etc. over the whole circumference. The outer flange portion 55B is also fitted into the inner circumferential surface of the noise-reducing tubular portion 52 at an inflow side end portion thereof, and fixed by welding, etc. over the whole circumference. This configuration seals between the outer circumferential surface of the pre-oxidation catalyst 26 at the inflow side end portion thereof into which the exhaust gas flows and the inner circumferential surface of the noise-reducing tubular portion 52 at the inflow side end portion thereof, so that all of the exhaust gas introduced into the first expansion chamber 56 flows into the pre-oxidation catalyst 26 (arrow 51A).

In addition, referring to FIG. 4, a second partition wall portion 57 that has a ring shape in a front view is disposed and seals between an outer circumferential surface of the pre-oxidation catalyst 26 at a downstream end portion thereof, that is, an outer circumferential surface of the pre-oxidation catalyst 26 at an outflow side end portion thereof from which the exhaust gas flows out and an inner circumferential surface of the noise-reducing tubular portion 52. A downstream end of the noise-reducing tubular portion 52 is closed. The noise-reducing tubular portion 52 has at a center portion thereof the outlet 25B having the substantially same diameter as that of the discharge cylinder portion 53. The discharge cylinder portion 53 is connected by welding, etc. to an outer end of the noise-reducing tubular portion 52 outward in the axial direction of the muffler 25 around the outlet 25B so as to be coaxial with the noise-reducing tubular portion 52. The discharge cylinder portion 53 is connected to the downstream side purification device 31 with the downstream side exhaust pipe 27 interposed therebetween.

With this configuration, a second expansion chamber 58 into which the exhaust gas flows through the pre-oxidation catalyst 26 is formed between the outlet 25B of the noise-reducing tubular portion 52, and the pre-oxidation catalyst 26 and the second partition wall portion 57. Thus, the first expansion chamber 56 and the second expansion chamber 58 are in communication with each other through a plurality of small holes formed in the pre-oxidation catalyst 26. Accordingly, the exhaust gas flowing through the inlet 25A flows through the first expansion chamber 56 and the second expansion chamber 58, so that noise reduction effect is exhibited.

Figure 10:
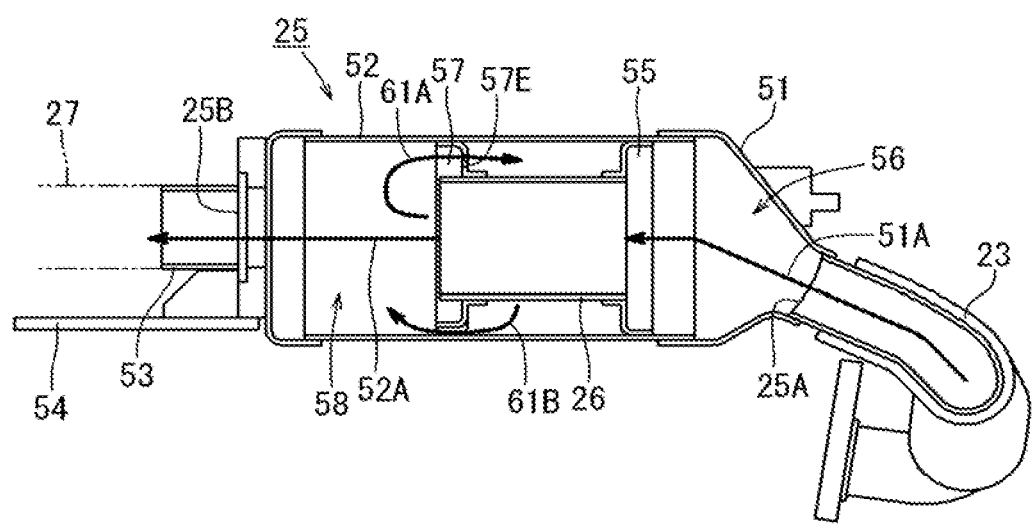
FIG. 10 is a sectional view of an example of the pre-oxidation catalyst that is disposed in another position.

With this configuration, for example, referring to FIG. 10, moving a position of the pre-oxidation catalyst 26 toward the downstream side (left side in FIG. 10) of the muffler 25 by a predetermined distance changes a volume of the first expansion chamber 56 and a volume of the second expansion chamber 58. This may change a frequency of noise to be particularly reduced. In addition, changing the length of the pre-oxidation catalyst 26 changes the volume of the first expansion chamber 56 and the volume of the second expansion chamber 58. This may also change a frequency of noise to be particularly reduced.

Figure 8:
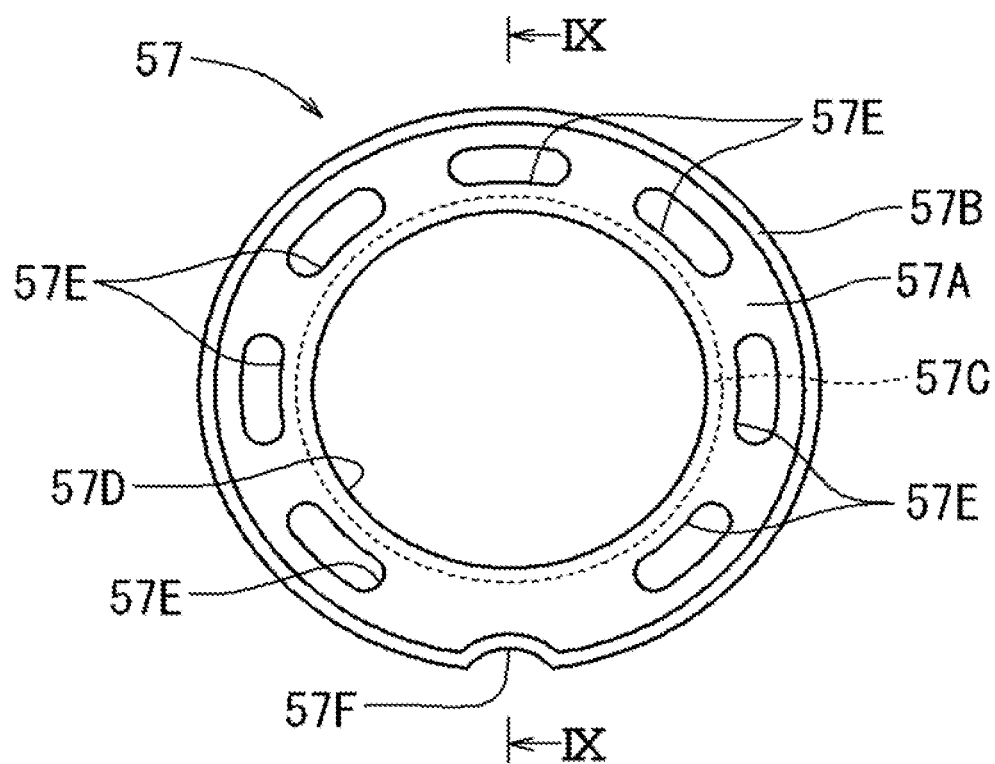
FIG. 8 is a front view of a second partition wall portion.
Figure 9:
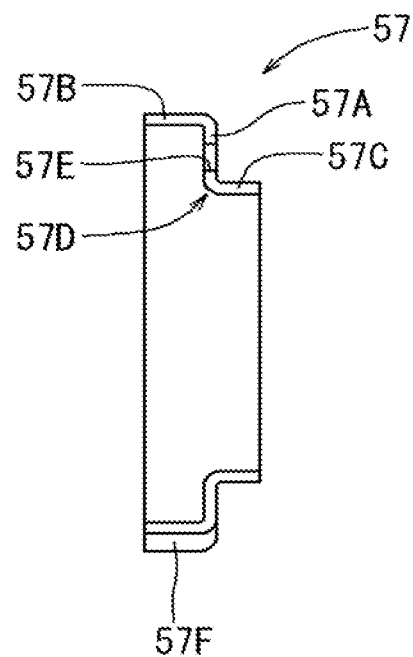
FIG. 9 is a sectional view as viewed in a direction of arrows IX, IX of FIG. 8.

Next, the following will describe the configuration of the second partition wall portion 57 with reference to FIGS. 8 and 9. Referring to FIGS. 8 and 9, the second partition wall portion 57 is formed by a steel plate that is about 1 mm to 2 mm in thickness. The second partition wall portion 57 includes a main body 57A that has a ring shape in a front view, an outer flange portion 57B, and an inner flange portion 57C. The outer flange portion 57B and the inner flange portion 57C extend in opposite directions in the axial direction of the muffler 25. The main body 57A has an outer diameter which is substantially the same as an inner diameter of the noise-reducing tubular portion 52 and an opening 57D in the center portion of the main body 57A. The opening 57D has an inner diameter which is substantially the same as an outer diameter of the pre-oxidation catalyst 26.

The main body 57A has seven through holes 57E each formed in a substantially oblong circular shape with a central angle of about 22.5 degrees. The seven through holes 57E are arranged side by side at a central angle of about 45 degrees on a concentric circle that is located in the center portion of the main body 57A in the radial direction of the second partition wall portion 57. In other words, the second partition wall portion 57 has the main body 57A facing the first partition wall portion 55. The main body 57A of the second partition wall portion 57 has the seven through holes 57E that are each formed in a substantially oblong circular shape and that are arranged at substantially regular intervals.

The outer flange portion 57B extends substantially perpendicular to the outer circumferential edge portion of the main body 57A over the whole circumference by a predetermined height (for example, about 20 mm in height) from the outer circumferential edge portion. In addition, in FIG. 8, a groove 57F that has a substantially half circular shape cross-section is formed at the bottom portion of the main body 57A, that is, the bottom portion of the outer flange portion. The groove 57F has a predetermined depth extending radially inward and an entire length of the outer flange portion 57B extending in the axial direction of the muffler 25. The inner flange portion 57C extends substantially perpendicular to an inner circumferential edge portion of the opening 57D in an opposite direction relative to the outer flange portion 57B in the axial direction of the muffler 25 over the whole circumference by a predetermined height (for example, about 20 mm in height) from the inner circumferential edge portion of the opening 57D.

Referring to FIG. 4, the inner flange portion 57C is fitted into the outer circumferential surface of the pre-oxidation catalyst 26 at the outflow side end portion thereof, and fixed by welding, etc. over the whole circumference. The outer flange portion 57B is also fitted into the inner circumferential surface of the noise-reducing tubular portion 52 at an inflow side end portion thereof. The outer flange portion 57B excluding the groove 57F is fixed by welding, etc. to the inner circumferential surface of the noise-reducing tubular portion 52. With this configuration, the exhaust gas flowing out from the pre-oxidation catalyst 26 flows into the second expansion chamber 58, and then flows into the discharge cylinder portion 53 through the outlet 25B (arrow 52A).

A part of the exhaust gas flowing out from the pre-oxidation catalyst 26 into the second expansion chamber 58 flows into an outer circumferential portion of the pre-oxidation catalyst 26 through the through holes 57E of the second partition wall portion 57 (arrow 61A). Then, the exhaust gas flows into the second expansion chamber 58 again through the groove 57F (arrow 61B), and flows into the outlet 25B (arrow 52A). Thus, the pre-oxidation catalyst 26 keeps the temperature due to heat insulation effect of the exhaust gas flowing through the through holes 57E.

The space around the pre-oxidation catalyst 26 between the main body 55A of the first partition wall portion 55 and the main body 57A of the second partition wall portion 57 forms a part of the second expansion chamber 58. Accordingly, the exhaust gas flowing out from the pre-oxidation catalyst 26 flows around the pre-oxidation catalyst 26 through the through holes 57E of the second partition wall portion 57, so that noise reduction effect may be exhibited.

Figure 11:
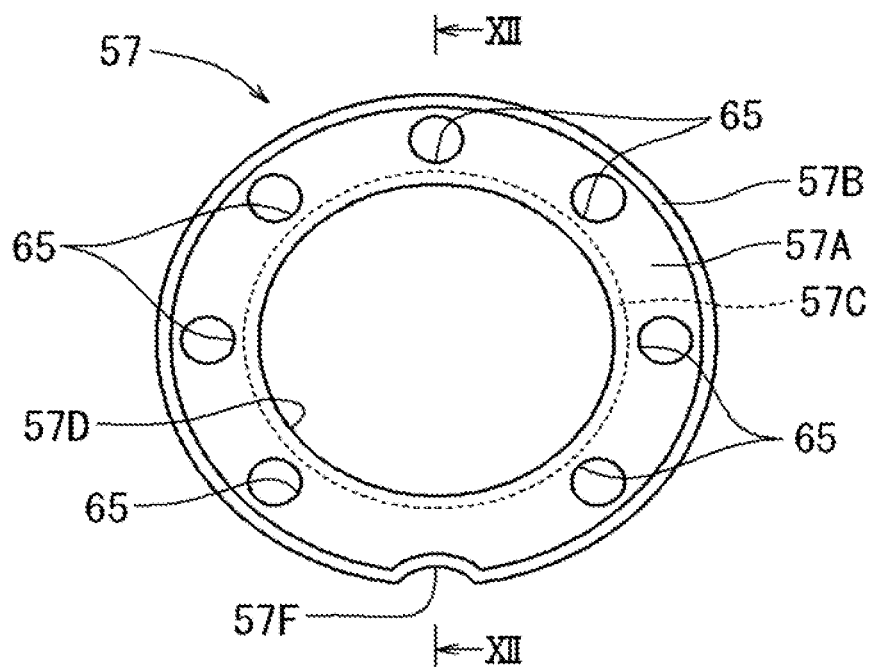
FIG. 11 is a front view of an example of through holes of the second partition wall portion that each have another shape.
Figure 12:
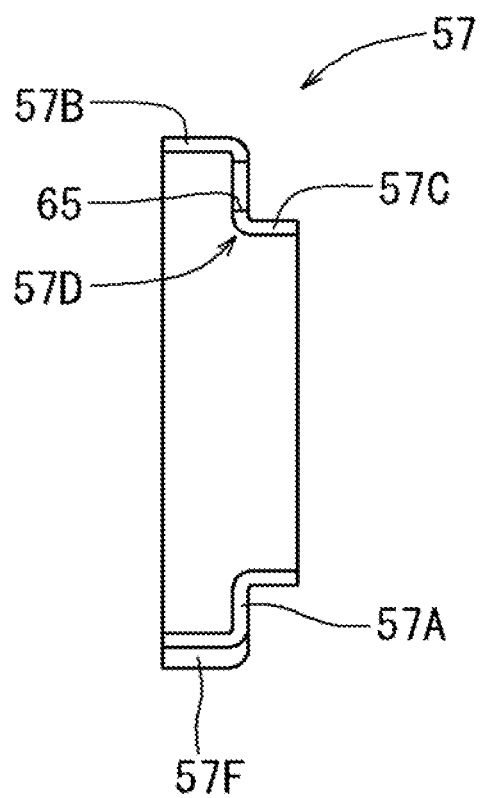
FIG. 12 is a sectional view as viewed in a direction of arrows XII, XII of FIG. 11.

Thus, for example, referring to FIGS. 11 and 12, the seven circular through holes 65 are provided in the main body 57A of the second partition wall portion 57 instead of the seven through holes 57E that are each formed in a substantially oblong circular shape, so that a frequency of noise to be reduced may be changed. This means that changing a shape and the number of a plurality of through holes formed in the main body 57A may change a frequency of noise to be reduced.

As described in detail above, the exhaust gas purification device 1 according to the present embodiment includes the pre-oxidation catalyst 26 that has a relatively small capacity (for example, the capacity of about 0.1 liters to 0.5 liters). With this configuration, the muffler 25 is provided in such a manner as to surround the pre-oxidation catalyst 26, so that the muffler 25 may be disposed in a space in the engine compartment 14 on which the engine 15 is mounted, that is, the space for mounting the engine. Accordingly, by using the space for mounting the engine effectively, an arrangement space of the muffler 25 may be easily ensured.

In the pre-oxidation catalyst 26, for example, layers of the catalyst support 26B made of aluminum oxide, etc. is formed and supported on the surfaces of the metal substrate 26A that has a honey-comb structure made of heat resistant metal such as stainless steel. Catalyst particles such as platinum (Pt), palladium (Pd), rhodium (Rh) are supported on the catalyst supports 26B. With this configuration, the metal substrate 26A has a small heat capacity. Therefore, the space around the metal substrate 26A is formed to be a part of the second expansion chamber 58 of the muffler 25 and the volume of the second expansion chamber 58 is increased, so that temperature decrease of the pre-oxidation catalyst 26 is prevented due to heat insulation effect of the exhaust gas.

Moving the pre-oxidation catalyst 26 that is supported by the first partition wall portion 55 and the second partition wall portion 57 in the noise-reducing tubular portion 52 changes a volume of the first expansion chamber 56 formed on the upstream side of the pre-oxidation catalyst 26 and a volume of the second expansion chamber 58 formed on the downstream side of the pre-oxidation catalyst 26. Thus, a frequency of noise of the muffler 25 to be particularly reduced is determined, so that noise reduction effect may be exhibited.

The exhaust gas flows into the outer circumferential portion of the pre-oxidation catalyst 26 through the through holes 57E formed in the main body 57A of the second partition wall portion 57 facing the first partition wall portion 55, so that temperature decrease of the pre-oxidation catalyst 26 may be effectively prevented. Changing the number and a shape of the through holes formed in the main body 57A of the second partition wall portion 57 facing the first partition wall portion 55 determines frequency of noise of the muffler 25 to be particularly reduced, so that the noise reduction effect may be enhanced.

After the exhaust gas flows through the downstream side purification device 31 accommodating the second oxidation catalyst 32 that is larger than the pre-oxidation catalyst 26 and the particulate matter removing filter (DPF) 33, the exhaust gas is discharged to the atmosphere. Accordingly, the muffler need not be connected to the downstream side purification device 31, so that the arrangement space of the downstream side purification device 31 may be easily ensured. Therefore, the miniaturization of the vehicle body 11 of the forklift 10 may be achieved.

The exhaust gas purification device according to the present invention is not limited to the structure, configuration, appearance, shape, steps, or the like described in the aforesaid embodiment, and modifications, improvements, additions, and deletions may be made within the scope of the present invention and without altering the gist of the present invention. It is noted that, in the following description, the same reference numerals as the configuration or the like of the exhaust gas purification device 1 according to the aforesaid embodiment illustrated in the above FIGS. 1 to 12 designate the same or counterpart parts of the configuration or the like of the exhaust gas purification device 1 according to the aforesaid embodiment.

Figure 13:
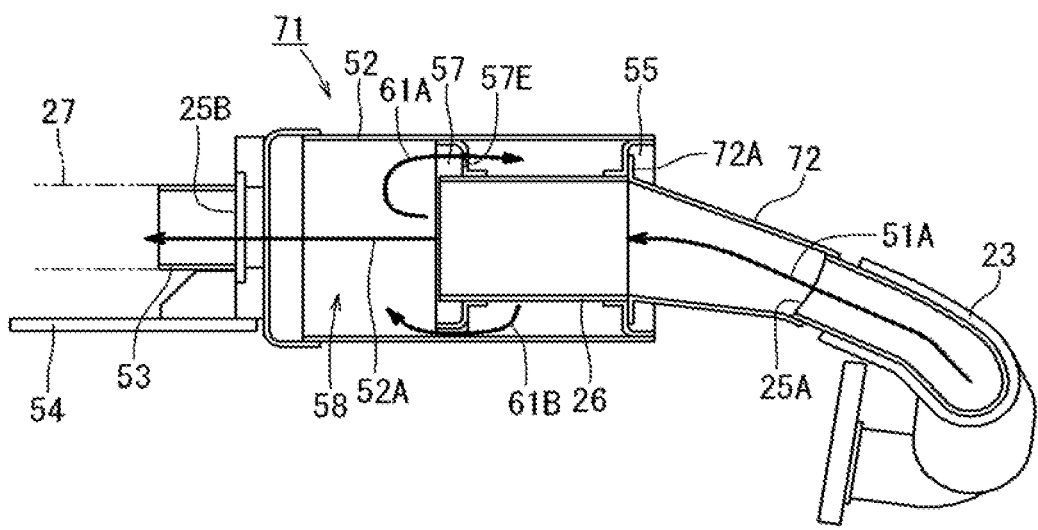
FIG. 13 is a cutaway side view partially showing an example of a muffler according to another first embodiment.

Another First Embodiment (A) For example, instead of the muffler 25 according to the aforesaid embodiment illustrated in FIG. 10, a muffler 71 illustrated in FIG. 13 may be used. Referring to FIG. 13, the muffler 71 has substantially the same configuration as that of the muffler 25 according to the aforesaid embodiment illustrated in FIG. 10. It is noted that the muffler 71 is different from the muffler 25 in that a connecting pipe 72 that has a substantially cylindrical shape is provided in the muffler 71 instead of the introducing tubular portion 51.

The upstream side exhaust pipe 23 is connected to the inlet 25A of the connecting pipe 72 at the upstream end portion thereof. A diameter of the connecting pipe 72 is gradually increased as the connecting pipe 72 extends toward the downstream side (left side in FIG. 13) of the muffler 71 in an obliquely upward direction. The downstream end portion of the connecting pipe 72 is in contact with the proximal end portion of the main body 55A of the first partition wall portion 55 (see FIG. 6) so as to cover the entire surface of the pre-oxidation catalyst 26 at the upstream end portion thereof. In addition, the connecting pipe 72 has a flange portion 72A that is formed in a ring shape, and extends radially outward by the predetermined length from the downstream end portion of the connecting pipe 72.

The flange portion 72A is brought into contact with a proximal portion radially inward of the main body 55A (see FIG. 6) of the first partition wall portion 55, and fixed by welding, etc. over the whole circumference. As a result, this configuration seals over the whole circumference between the outer $1s$ circumferential portion of the pre-oxidation catalyst 26 at the inflow side end portion thereof into which the exhaust gas flows and the downstream end portion of the connecting pipe 72, so that all of the exhaust gas introduced into the connecting pipe 72 flows into the pre-oxidation catalyst 26 (arrow 51A).

With this configuration, the connecting pipe 72 may be achieved to have a smaller diameter than that of the introducing tubular portion 51 according to the aforesaid embodiment, and the connecting pipe 72 may be shortened because an expansion chamber is not formed on the upstream side of the pre-oxidation catalyst 26. Therefore, the miniaturization of the muffler 71 may be achieved. In addition, moving the pre-oxidation catalyst 26 supported by the first partition wall portion 55 and the second partition wall portion 57 in the noise-reducing tubular portion 52 may change a volume of the second expansion chamber (expansion chamber) 58 formed on the downstream side of the pre-oxidation catalyst 26. Thus, the frequency of noise of the muffler 71 to be particularly reduced is determined, so that noise reduction effect may be exhibited.

Figure 14:
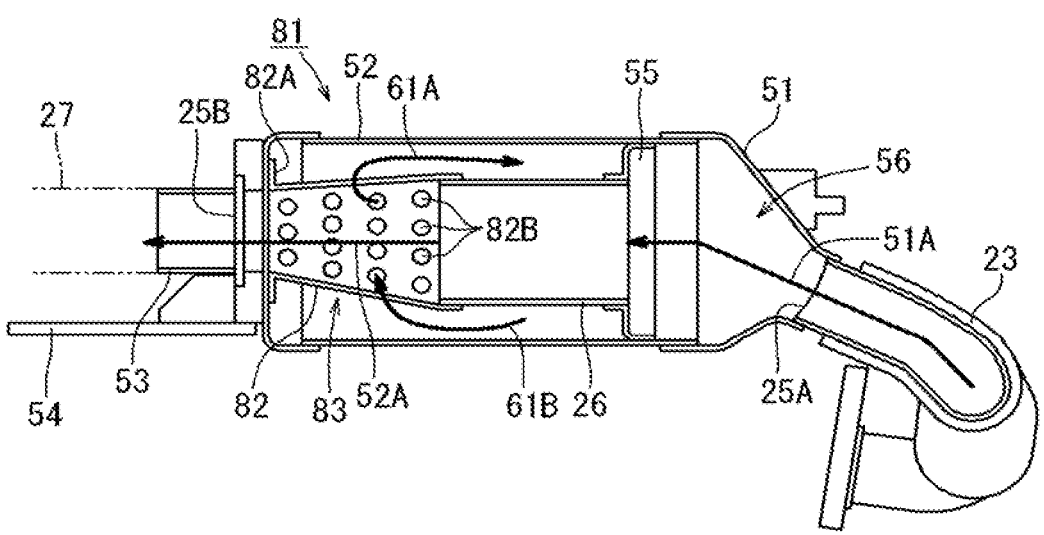
FIG. 14 is a cutaway side view partially showing an example of a muffler according to another second embodiment.

Another Second Embodiment (B) For example, instead of the muffler 25 according to the aforesaid embodiment illustrated in FIG. 10, a muffler 81 illustrated in FIG. 14 may be used. Referring to FIG. 14, the muffler 81 has substantially the same configuration as that of the muffler 25 according to the aforesaid embodiment illustrated in FIG. 10. It is noted that the muffler 81 is different from the muffler 25 in that a perforated pipe 82 is provided in the muffler 81 instead of the second partition wall portion 57.

The perforated pipe 82 is formed in a substantially cylindrical shape. An upstream edge portion (one end) of the perforated pipe 82 is fitted into the outer circumferential surface of the pre-oxidation catalyst 26 at the downstream edge portion thereof, that is, the outer circumferential surface of the pre-oxidation catalyst 26 at the outflow side end portion thereof from which the exhaust gas flows out, and fixed by welding, etc. over the whole circumference. A downstream edge portion (the other end) of the perforated pipe 82 is in contact with and coaxial with the proximal portion of the outlet 25B. In addition, the perforated pipe 82 has a flange portion 82A that is formed in a ring shape, and extends radially outward by the predetermined length from the downstream end portion of the perforated pipe 82.

The flange portion 82A is brought into contact with a circumferential edge of the outlet 25B at the upstream end portion thereof, and fixed by welding, etc. over the whole circumference. As a result, the downstream end portion of the pre-oxidation catalyst 26 and the outlet 25B is connected substantially coaxially with the perforated pipe 82 interposed therebetween. With this configuration, the pre-oxidation catalyst 26 is supported by the first partition wall portion 55 and the perforated pipe 82 in the noise-reducing tubular portion 52. The perforated pipe 82 has a plurality of perforated holes 82B that are formed through an outer circumferential surface of the perforated pipe 82. An outer circumferential expansion chamber 83 is provided between the outer circumferential surface of the perforated pipe 82 and the outer circumferential surface of the pre-oxidation catalyst 26, and the inner circumferential surface of the noise-reducing tubular portion 52. The exhaust gas introduced from the pr-oxidation catalyst 26 flows into the perforated pipe 82, and flows into the outer circumferential expansion chamber 83 through the plurality of the perforated holes 82B.

Accordingly, the exhaust gas introduced from the pre-oxidation catalyst 26 into the perforated pipe 82 flows into the outer circumferential expansion chamber 83 through the plurality of perforated holes 82B, so that noise reduction effect may be exhibited by the outer circumferential expansion chamber 83 and the first expansion chamber 56. Furthermore, changing the number and shapes of the perforated holes 82B formed in the perforated pipe 82 determines a frequency of noise of the muffler 81 to be particularly reduced, so that the noise reduction effect is enhanced. The exhaust gas flows into the outer circumferential expansion chamber 83 covering the outer circumferential portion of the pre-oxidation catalyst 26 through the perforated holes 82B formed in the perforated pipe 82, so that temperature decrease of the pre-oxidation catalyst 26 may be effectively prevented.

(C) For example, the pre-oxidation catalyst 26 may be formed in a columnar shape that has a rectangular cross-section. The noise-reducing tubular portion 52 of the muffler 25 is formed in a tubular shape that may be a rectangular cross-section, and the first partition wall portion 55 and the second partition wall portion 57 may be each formed in a rectangular frame shape. Then, a plurality of through holes may be formed in the main body 57A of the second partition wall portion 57 that has a rectangular frame shape and faces the first partition wall portion 55. With this configuration, by using the space for mounting the engine effectively, an arrangement space of the muffler 25 may be easily ensured.

(D) For example, the DPF 33 is used as the purifying processing member to purify the exhaust gas in the present embodiment. However, NOx reduction device may be applied as the exhaust gas purification device. In this case, a selective catalytic reduction catalyst for reducing NOx and a urea water injection valve from which urea-water is injected to the selective catalytic reduction catalyst correspond to the purifying processing member.

(E) For example, the exhaust gas purification device 1 may be generally mounted to not only the forklift 10 but also the other industrial vehicles using a diesel engine, such as construction equipment including a dump truck, a hydraulic shovel excavator, a hydraulic crane truck or the like.

REFERENCE SIGNS LIST 1 exhaust gas purification device
11 vehicle body
15 engine
23 upstream side exhaust pipe
25, 71, 81 muffler
25A inlet
25B outlet
26 pre-oxidation catalyst
26A metal substrate
26B catalyst support
27 downstream side exhaust pipe
31 downstream side purification device
32 second oxidation catalyst
33 Diesel Particulate Filter (DPF)
51 introducing tubular portion
52 noise-reducing tubular portion
55 first partition wall portion
56 first expansion chamber
57 second partition wall portion
57E, 65 through hole
58 second expansion chamber (expansion chamber)
72 connecting pipe
82 perforated pipe
82B perforated hole
83 outer circumferential expansion chamber

The invention claimed is:

1. An exhaust gas purification device comprising:
a pre-oxidation catalyst disposed in an exhaust gas passage disposed right next to an engine mounted in an engine compartment of a vehicle body of an industrial vehicle;
a muffler that is provided in the engine compartment in such a manner as to surround the pre-oxidation catalyst, and discharges exhaust gas generated in the engine while reducing noise;
a ventilation chamber that is adjacent to the engine compartment, and has an air outlet port formed through a counterweight of the vehicle body; and
a downstream side purification device that is disposed in the exhaust gas passage within the ventilation chamber, where the exhaust gas passage is brought to the ventilation chamber from a downstream side of the muffler, and accommodates a second oxidation catalyst that is larger than the pre-oxidation catalyst and either a particulate matter removing filter or an NOx reduction device,
the muffler has:
an inlet which is connected to an upstream side exhaust pipe right next to the engine, and into which the exhaust gas is introduced; and
an outlet which is connected to a downstream side exhaust pipe, and from which the exhaust gas introduced from the inlet is discharged through the pre-oxidation catalyst, and
the exhaust gas is discharged to the atmosphere after the exhaust gas flows through the downstream side purification device.

2. The exhaust gas purification device according to claim 1, wherein
the pre-oxidation catalyst has:
a catalyst support that supports catalyst particles; and
a metal substrate that has thereon the catalyst support.

3. The exhaust gas purification device according to claim 1, wherein
the muffler has:
a noise-reducing tubular portion that is formed in a tubular shape, and in which the pre-oxidation catalyst is disposed;
a connecting pipe that has at one end thereof the inlet and is at the other end thereof connected to the pre-oxidation catalyst at the inflow side end portion of the pre-oxidation catalyst, wherein the exhaust gas introduced into the inlet flows out to the pre-oxidation catalyst at the inflow side end portion thereof through the connecting pipe;
a first partition wall portion that seals between an outer circumferential surface of the pre-oxidation catalyst at an inflow side end portion thereof and an inner circumferential surface of the noise-reducing tubular portion;
a second partition wall portion that faces the first partition wall portion and seals between the outer circumferential surface of the pre-oxidation catalyst at an outflow side end portion thereof and the inner circumferential surface of the noise-reducing tubular portion; and
an expansion chamber which is formed between the second partition wall portion and the pre-oxidation catalyst at the outflow side end portion thereof, and the outlet, wherein the exhaust gas flows into the expansion chamber through the pre-oxidation catalyst, and
the pre-oxidation catalyst is supported by the first partition wall portion and the second partition wall portion in the noise-reducing tubular portion.

4. The exhaust gas purification device according to claim 1, wherein
the downstream side purification device extends along a vehicle width direction across a width of the ventilation chamber.

5. The exhaust gas purification device according to claim 1, wherein
the muffler has:
a noise-reducing tubular portion that is formed in a tubular shape, and in which the pre-oxidation catalyst is disposed;
a first expansion chamber which is formed between the inlet and the pre-oxidation catalyst, and into which the exhaust gas flows;
a first partition wall portion that is disposed on an outflow side of the first expansion chamber and seals between an outer circumferential surface of the pre-oxidation catalyst at an inflow side end portion thereof and an inner circumferential surface of the noise-reducing tubular portion;
a second partition wall portion that faces the first partition wall portion and seals between an outer circumferential surface of the pre-oxidation catalyst at an outflow side end portion thereof and the inner circumferential surface of the noise-reducing tubular portion; and
a second expansion chamber which is formed between the second partition wall portion and the pre-oxidation catalyst at the outflow side end portion thereof, and the outlet, wherein the exhaust gas flows into the second expansion chamber through the pre-oxidation catalyst, and
the pre-oxidation catalyst is supported by the first partition wall portion and the second partition wall portion in the noise-reducing tubular portion.

6. The exhaust gas purification device according to claim 5, wherein
the second partition wall portion has a plurality of through holes that are formed through a surface of the second partition wall portion that faces the first partition wall portion.

7. An exhaust gas purification device comprising:
a pre-oxidation catalyst disposed in an exhaust gas passage disposed right next to an engine mounted in a vehicle body; and
a muffler that is provided in such a manner as to surround the pre-oxidation catalyst, and discharges exhaust gas generated in the engine while reducing noise; wherein
the muffler has:
an inlet which is connected to an upstream side exhaust pipe right next to the engine, and into which the exhaust gas is introduced;
an outlet which is connected to a downstream side exhaust pipe, and from which the exhaust gas introduced from the inlet is discharged through the pre-oxidation catalyst;
a noise-reducing tubular portion that is formed in a tubular shape, and in which the pre-oxidation catalyst is disposed;
a first expansion chamber which is formed between the inlet and the pre-oxidation catalyst, and into which the exhaust gas flows;
a first partition wall portion that is disposed on an outflow side of the first expansion chamber and seals between an outer circumferential surface of the pre-oxidation catalyst at an inflow side end portion thereof and an inner circumferential surface of the noise-reducing tubular portion;
a perforated pipe that is at one end thereof connected to the outer circumferential surface of the pre-oxidation catalyst at an outflow side end portion of the pre-oxidation catalyst, and at the other end thereof connected to the outlet, the perforated pipe having a plurality of perforated holes that are formed through an outer circumferential surface of the perforated pipe; and
an outer circumferential expansion chamber that is provided between the outer circumferential surface of the perforated pipe and the outer circumferential surface of the pre-oxidation catalyst, and the inner circumferential surface of the noise-reducing tubular portion, wherein the exhaust gas flowing through the pre-oxidation catalyst flows into the outer circumferential expansion chamber through the plurality of the perforated holes,
the pre-oxidation catalyst is supported by the first partition wall portion and the one end of the perforated pipe in the noise-reducing tubular portion;
the exhaust purification device includes a downstream side purification device that is disposed in the exhaust gas passage on a downstream side of the muffler, and accommodates a second oxidation catalyst that is larger than the pre-oxidation catalyst and a particulate matter removing filter; and the exhaust gas is discharged to the atmosphere after the exhaust gas flows through the downstream side purification device.

8. The exhaust gas purification device according to claim 7, wherein the downstream side purification device extends along a vehicle width direction across a width of the ventilation chamber.

* * * * *